(12) United States Patent
Hiramoto et al.

(10) Patent No.: US 9,250,065 B2
(45) Date of Patent: Feb. 2, 2016

(54) DEPTH ESTIMATING IMAGE CAPTURE DEVICE

(71) Applicant: Panasonic Corporation, Osaka (JP)

(72) Inventors: Masao Hiramoto, Osaka (JP); Yasunori Ishii, Osaka (JP); Yusuke Monobe, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 298 days.

(21) Appl. No.: 14/117,337

(22) PCT Filed: Mar. 14, 2013

(86) PCT No.: PCT/JP2013/001736
§ 371 (c)(1),
(2) Date: Nov. 12, 2013

(87) PCT Pub. No.: WO2013/179538
PCT Pub. Date: Dec. 5, 2013

(65) Prior Publication Data
US 2015/0138527 A1  May 21, 2015

(30) Foreign Application Priority Data

May 28, 2012 (JP) ................................. 2012-121022

(51) Int. Cl.
*G01C 3/08* (2006.01)
*G01B 11/22* (2006.01)
(Continued)

(52) U.S. Cl.
CPC ................ *G01B 11/22* (2013.01); *G01B 11/24* (2013.01); *G02B 5/1814* (2013.01); *G02B 5/3025* (2013.01); *G03B 35/08* (2013.01); *H04N 13/0217* (2013.01)

(58) Field of Classification Search
CPC . G01B 11/22; H04N 13/0217; H01L 51/5275
USPC ....................................................... 356/4.01
See application file for complete search history.

(56) References Cited

U.S. PATENT DOCUMENTS

2002/0171740 A1  11/2002  Seo
2009/0284627 A1  11/2009  Bando et al.
(Continued)

FOREIGN PATENT DOCUMENTS

JP  62-217790 A  9/1987
JP  62-291292 A  12/1987
(Continued)

OTHER PUBLICATIONS

International Search Report for corresponding International Application No. PCT/JP2013/001736, mailed Jun. 18, 2013.
(Continued)

*Primary Examiner* — Mark Hellner
(74) *Attorney, Agent, or Firm* — Renner, Otto, Boisselle & Sklar, LLP

(57) ABSTRACT

This image capture device includes: a light-transmitting section 1 that is made up of a plurality of portions 1AB, each including diffraction regions 1D1, 1D2 that diffract incoming light, a transparent region 1CLR that transmits the incoming light without diffracting it, and polarization regions 1P1, 1P2 arranged so as to overlap at least partially with the diffraction regions 1D1, 1D2; an image sensor in which a plurality of unit elements are arranged two-dimensionally on an imaging area, wherein each of the unit elements includes a first photosensitive cell, a second photosensitive cell, and a polarization filter arranged so as to face the first photosensitive cell; and an imaging section configured to obtain images produced on the imaging area by the light transmitted through the transparent region and by the light transmitted through the diffraction region.

11 Claims, 8 Drawing Sheets

(51) Int. Cl.
*G03B 35/08* (2006.01)
*H04N 13/02* (2006.01)
*G02B 5/18* (2006.01)
*G02B 5/30* (2006.01)
*G01B 11/24* (2006.01)

(56) References Cited

U.S. PATENT DOCUMENTS

| | | | |
|---|---|---|---|
| 2010/0066812 A1 | 3/2010 | Kajihara et al. | |
| 2010/0176473 A1* | 7/2010 | Nishiwaki | H01L 27/14621 257/432 |
| 2010/0322481 A1 | 12/2010 | Katano et al. | |
| 2012/0105598 A1 | 5/2012 | Hiramoto et al. | |

FOREIGN PATENT DOCUMENTS

| | | | |
|---|---|---|---|
| JP | 2-502398 T | 8/1990 |
| JP | 11-098532 A | 4/1999 |
| JP | 11-352454 A | 12/1999 |
| JP | 2002-344999 A | 11/2002 |
| JP | 2003-134533 A | 5/2003 |
| JP | 2008-167395 A | 7/2008 |
| JP | 2009-276294 A | 11/2009 |
| JP | 2011-002387 A | 1/2011 |
| JP | 2011-239241 A | 11/2011 |
| WO | WO 88/05525 A1 | 7/1988 |

OTHER PUBLICATIONS

Written Opinion for corresponding International Application No. PCT/JP2013/001736, dated Jun. 18, 2013.

Ren Ng, et al, "Light Field Photography with a Hand-held Plenoptic Camera", Stanford Tech Report CTSR Feb. 2005, cited on p. 3 in [0005] of the Specification.

Co-pending U.S. Appl. No. 14/008,799, filed Sep. 30, 2013.

* cited by examiner

DIRECT LIGHT: ———
DIFFRACTED LIGHT: ·········

DIRECT LIGHT: ———
DIFFRACTED LIGHT: ·········

DIRECT LIGHT: ———
DIFFRACTED LIGHT: ·········

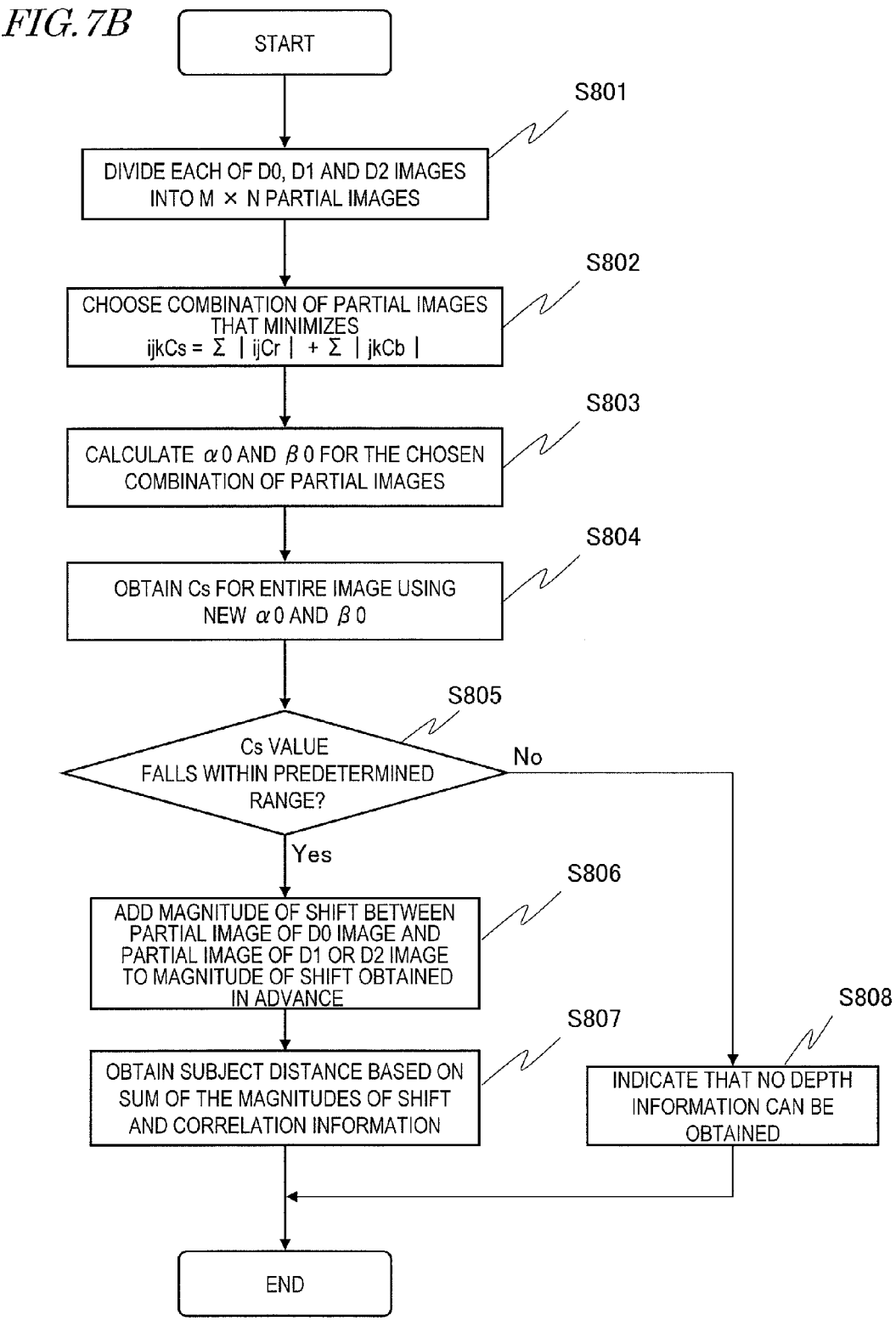

DEPTH ESTIMATING IMAGE CAPTURE DEVICE

TECHNICAL FIELD

The present application relates to a single-lens 3D image capturing technology for obtaining subject's depth information using a single optical system and a single image sensor.

BACKGROUND ART

Recently, the performance and functionality of digital cameras and digital movie cameras that use some solid-state image sensor such as a CCD or a CMOS (which will be sometimes simply referred to herein as an "image sensor") have been enhanced to an astonishing degree. In particular, the size of a pixel structure for use in an image sensor has been further reduced these days thanks to rapid development of semiconductor device processing technologies, thus getting an even greater number of pixels and drivers integrated together in an image sensor. As a result, the resolution of an image sensor has lately increased rapidly from around one million pixels to ten million or more pixels in a matter of few years. On top of that, the quality of an image captured has also been improved significantly as well. As for display devices, on the other hand, LCD and plasma displays with a reduced depth now provide high-resolution and high-contrast images, thus realizing high performance without taking up too much space. And such video quality improvement trends are now spreading from 2D images to 3D images. In fact, 3D display devices that achieve high image quality although they require the viewer to wear a pair of polarization glasses have been developed just recently.

As for the 3D image capturing technology, a typical 3D image capture device with a simple arrangement uses an image capturing system with two cameras to capture a right-eye image and a left-eye image. According to such a so-called "two-lens image capturing" technique, however, two cameras need to be used, thus increasing not only the overall size of the image capture device but also the manufacturing cost as well. To overcome such a problem, methods for capturing multiple images with parallax (which will be sometimes referred to herein as "multi-viewpoint images") by using a single camera have been researched and developed. Such a method is called a "single-lens image capturing method".

For example, Patent Documents Nos. 1 and 2 disclose a method for obtaining multi-viewpoint images by using two polarizers, of which the transmission axes cross each other at right angles, and a rotating polarization filter. Meanwhile, Patent Documents Nos. 3 to 5 disclose a method for obtaining multi-viewpoint images by using a diaphragm (light beam confining plate) with multiple color filters.

The methods disclosed in these Patent Documents Nos. 1 to 5 are used mostly to generate multi-viewpoint images using a single-lens camera. On the other hand, there is a technique for getting depth information using a single-lens camera with multiple micro lenses and for changing the focus position of the image captured freely based on that information. Such a technique is called "light field photography" and a single-lens camera that uses such a technique is called a "light field camera". In a light field camera, a number of micro lenses are arranged on an image sensor. Each of those micro lenses is arranged so as to cover a plurality of pixels. By calculating information about the direction of incoming light based on the image information gotten through the image capturing session, the subject's depth can be estimated. Such a camera is disclosed in Non-Patent Document No. 1, for example.

The light field camera can calculate depth information. But its resolution is determined by the number of micro lenses and should be lower than the resolution determined by the number of pixels of the image sensor, which is a problem. Thus, to overcome such a problem, Patent Document No. 6 discloses a technique for increasing the resolution using two image capturing systems. According to such a technique, the incoming light is split into two divided incoming light beams, which are imaged by two image capturing systems, of which the groups of micro lenses are arranged so as to spatially shift from each other by a half pitch, and then the images captured in this manner are synthesized together, thereby increasing the resolution. However, this technique requires two image capturing systems, thus causing size and cost problems, too.

To overcome such a problem, Patent Document No. 7 discloses a technique for changing the modes of operation from a normal shooting mode into the light field photography mode, or vice versa, using a single image capturing system. According to this technique, a micro lens, of which the focal length varies according to the voltage applied, is used. Specifically, the focal length of the micro lens is set to be the infinity in the former mode and set to be a predetermined length in the latter mode. By adopting such a mechanism, an image with high resolution and depth information can be obtained. However, this technique requires a sophisticated control technique for controlling the focal length of the micro lens.

Meanwhile, Patent Documents Nos. 8 and 9 disclose techniques which were developed mainly for the purpose of getting depth information. According to these techniques, an image is captured through a diffraction grating which is arranged in front of a camera, and the distance from the subject to the diffraction grating is measured based on the magnitude of positional shift between an image produced by a zero-order diffracted light beam that has been transmitted through the diffraction grating (which will be referred to herein as a "zero-order light image") and an image produced by a high-order diffracted light beam (which will be referred to herein as a "high-order light image")

CITATION LIST

Patent Literature

Patent Document No. 1: Japanese Laid-Open Patent Publication No. 62-291292
Patent Document No. 2: Japanese Laid-Open Patent Publication No. 62-217790
Patent Document No. 3: Japanese Laid-Open Patent Publication No. 2002-344999
Patent Document No. 4: Japanese Laid-Open Patent Publication No. 2009-276294
Patent Document No. 5: Japanese Laid-Open Patent Publication No. 2003-134533
Patent Document No. 6: Japanese Laid-Open Patent Publication No. 11-98532
Patent Document No. 7: Japanese Laid-Open Patent Publication No. 2008-167395
Patent Document No. 8: PCT International Application Japanese National Phase Publication No. 2-502398
Patent Document No. 9: Japanese Laid-Open Patent Publication No. 2011-2387

Non-Patent Literature

Non-Patent Document No. 1: Ren Ng, et al., "Light Field Photography with a Hand-held Plenoptic Camera", Stanford Tech Report CTSR 2005-02

SUMMARY OF INVENTION

Technical Problem

With the conventional light field camera, depth information can be certainly obtained but the resolution of the resultant image decreases, which is a problem. To overcome the problem, the optical system should be modified as in the techniques disclosed in Patent Documents Nos. 6 and 7. To modify the optical system, however, either two image capturing systems should be used or the focus length of the micro lens should be controlled.

Also, according to the method for measuring the depth using a diffraction grating as disclosed in Patent Documents Nos. 8 and 9, it is so difficult to separate the zero-order light image and the high-order light image from each other that the distance to the subject sometimes cannot be measured accurately. For example, according to the method disclosed in Patent Document No. 9, a zero-order light image and a first-order light image are distinguished based on the luminance gradient of a diffracted image and the magnitude of their shift is measured. And the subject's depth is obtained based on that magnitude of shift. Actually, however, it is difficult to accurately match two images with mutually different luminance levels such as the zero-order light image and the first-order light image.

An embodiment of the present invention provides an image capturing technique, by which an image with a minimized decrease in resolution and depth information can be obtained at the same time using a different optical system and a different kind of signal processing than the conventional ones. Another embodiment of the present invention provides an image processing technique, by which multiple images including the same subject but having mutually different luminance levels can be easily matched to each other.

Solution to Problem

To overcome the problem described above, a depth estimating image capture device according to an embodiment of the present invention includes: a light-transmitting section that is made up of a plurality of portions, each including a diffraction region that diffracts incoming light, a transparent region that transmits the incoming light without diffracting the light, and a polarization region arranged so as to overlap at least partially with the diffraction region; an image sensor in which a plurality of unit elements are arranged two-dimensionally on an imaging area, wherein each of the unit elements includes a first photosensitive cell, a second photosensitive cell, and a polarization filter arranged so as to face the first photosensitive cell; an imaging section configured to obtain images produced on the imaging area by the light transmitted through the transparent region and by the light transmitted through the diffraction region; and a signal processing section that processes a signal supplied from the image sensor.

This general and particular aspect can be implemented as a system, a method, a computer program or a combination thereof.

Advantageous Effects of Invention

According to an embodiment of the present invention, an image produced by diffracted light and an image produced by straight light can be separated from each other, and therefore, the subject's depth can be calculated based on those images.

Also, according to another embodiment, a plurality of images representing the same subject can be easily matched to each other.

BRIEF DESCRIPTION OF DRAWINGS

FIG. 7B A flowchart showing an alternative procedure of depth information generation processing according to the first exemplary embodiment.

DESCRIPTION OF EMBODIMENTS

Figure 1:
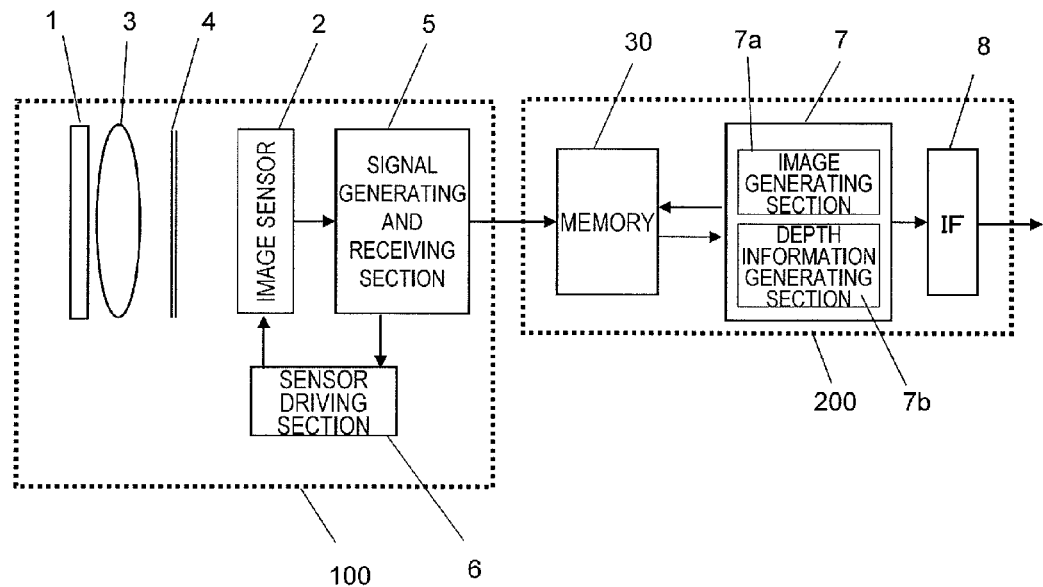
FIG. 1 A diagram illustrating a configuration for an image capture device according to an exemplary embodiment.

Exemplary embodiments of the present invention are outlined as follows:

(1) A depth estimating image capture device according to an embodiment of the present invention includes: a light-transmitting section that is made up of a plurality of portions, each including a diffraction region that diffracts incoming light, a transparent region that transmits the incoming light without diffracting the light, and a polarization region arranged so as to overlap at least partially with the diffraction region; an image sensor in which a plurality of unit elements are arranged two-dimensionally on an imaging area, wherein each of the unit elements includes a first photosensitive cell, a second photosensitive cell, and a polarization filter arranged so as to face the first photosensitive cell; an imaging section configured to obtain images produced on the imaging area by the light transmitted through the transparent region and by the light transmitted through the diffraction region; and a signal processing section that processes a signal supplied from the image sensor.

(2) In one embodiment, if the unit elements are arranged on the imaging area in x and y directions, the diffraction region is configured to generate mainly an $n^{th}$-order diffracted light ray (where n is an integer that is equal to or greater than one) and to make the $n^{th}$-order diffracted light ray incident at a point on the imaging area that has shifted in either the x direction or the y direction with respect to the point of incidence of the light that has been transmitted through the transparent region.

(3) In one embodiment of the depth estimating image capture device of (2), if the diffraction region, the polarization region and the polarization filter are called a first diffraction region, a first polarization region and a first polarization filter, respectively, each of the plurality of portions of the light-transmitting section further includes a second diffraction region that generates mainly an $n^{th}$-order diffracted light ray and a second polarization region that is arranged so as to overlap at least partially with the second diffraction region and that has a different polarization transmission axis direction from the first polarization region, and each unit element of the image sensor further includes a third photosensitive cell, and a second polarization filter that is arranged to face the third photosensitive cell and that has a different polarization transmission axis direction from the first polarization filter.

(4) In one embodiment of the depth estimating image capture device of (3), the first and second diffraction regions are configured so that the $n^{th}$-order diffracted light rays that have gone out of the first and second diffraction regions are incident on the imaging area at respective points that are symmetric to a point of incidence of the light that has been transmitted through the transparent region.

(5) In one embodiment of the depth estimating image capture device of (1), the diffraction region is configured to generate a zero-order diffracted light ray and $\pm n^{th}$-order diffracted light rays (where n is an integer that is equal to or greater than one). The polarization region includes a first polarization region that is arranged on the path of the $+n^{th}$-order diffracted light ray and a second polarization region that is arranged on the path of the $-n^{th}$-order diffracted light ray and that has a different polarization transmission axis direction from the first polarization region. Each unit element of the image sensor further includes a third photosensitive cell and a third polarization filter that is arranged to face the third photosensitive cell and that has a different polarization transmission axis direction from the first polarization filter.

(6) In one embodiment of the depth estimating image capture device of one of (3) to (5), the polarization transmission axis direction of one of the first and second polarization regions is the same as the polarization transmission axis direction of one of the first and second polarization filters.

(7) In one embodiment of the depth estimating image capture device of one of (3) to (6), the polarization transmission axis direction of the first polarization region intersects with the polarization transmission axis direction of the second polarization region at right angles, and the polarization transmission axis direction of the first polarization filter intersects with the polarization transmission axis direction of the second polarization filter at right angles.

(8) In one embodiment of the depth estimating image capture device of (1) or (2), the signal processing section includes an image processing section that obtains, based on respective output signals of the first and second photosensitive cells, a first image generated by the light that has been transmitted through the diffraction region and a second image generated by the light that has been transmitted through the transparent region.

(9) In one embodiment of the depth estimating image capture device of (6), the image processing section generates information about the subject's depth based on the magnitude of shift between the respective positions of the subject on the first and second images.

(10) In one embodiment of the depth estimating image capture device of one of (3) to (5), the signal processing section includes an image processing section that obtains, based on first, second and third signals supplied from the first, second and third photosensitive cells, respectively, first, second and third images generated by the light transmitted through the first diffraction region, the light transmitted through the second diffraction region, and the light transmitted through the transparent region, respectively.

(11) In one embodiment of the depth estimating image capture device of (8), the image processing section generates information about the subject's depth based on the magnitude of shift between the positions of the subject on the first and third images and on the magnitude of shift between the positions of the subject on the second and third images.

Hereinafter, more specific embodiments of the present invention will be described with reference to the accompanying drawings. In the following description, any element shown in multiple drawings and having substantially the same function will be identified by the same reference numeral.

Embodiment 1

First of all, a depth estimating image capture device as first embodiment of the present invention will be described. FIG. 1 is a block diagram illustrating an overall configuration for an image capture device according to this embodiment. The image capture device of this embodiment is a digital electronic camera and includes an image capturing section 100 and a signal processing section 200 that generates a signal representing an image (i.e., an image signal) based on the signal generated by the image capturing section 100. The image capture device may have the function of generating a moving picture, not just a still picture.

The image capturing section 100 includes a solid-state image sensor 2 (which will be simply referred to herein as an "image sensor") with a number of photosensitive cells which are arranged on its imaging area (and which will be sometimes referred to herein as "pixels"), a light-transmitting plate (light-transmitting section) 1 with a diffraction grating area and a polarization area, an optical lens (imaging section) 3 which produces an image on the imaging area of the image sensor 2, and an infrared cut filter 4. Even though the light-transmitting plate 1 is arranged in front of the optical lens 3, the light-transmitting plate 1 may also be arranged behind the optical lens 3 as well. The image sensor 2 includes pixels on which polarization filters are arranged and pixels on which no polarization filters are arranged. The image capturing section 100 further includes a signal generating and receiving section 5 which not only generates a fundamental signal to drive the image sensor 2 but also receives the output signal of the image sensor 2 and sends it to the signal processing section 200, and a sensor driving section 6 which drives the image sensor 2 in accordance with the fundamental signal generated by the signal generating and receiving section 5. The image sensor 2 is typically a CCD or CMOS sensor, which may be fabricated by known semiconductor device processing technologies.

The signal generating and receiving section 5 and the sensor driving section 6 may be implemented as an LSI such as a CCD driver.

The signal processing section 200 includes an image processing section 7 which processes the output signal of the image capturing section 100 to generate a plurality of images, a memory 30 which stores various kinds of data for use to generate the image signal, and an image interface (I/F) section 8 which sends out the image signal and depth information thus generated to an external device. The image processing section 7 includes an image generating section 7a which generates image information based on the signal supplied from the image capturing section 100 and a depth information generating section 7b which generates depth information. The image processing section 7 may be a combination of a hardware component such as a known digital signal processor (DSP) and a software program for use to perform image processing involving the image signal generation. The memory 30 may be a DRAM, for example. And the memory 30 not only stores the signal supplied from the image capturing section 100 but also temporarily retains the image data that has been generated by the image processing section 7 or compressed image data. These image data are then output to either a storage medium or a display section by way of the interface section 8.

The depth estimating image capture device of this embodiment actually further includes an electronic shutter, a viewfinder, a power supply (or battery), a flashlight and other known components. However, description thereof will be omitted herein, because none of them are essential components that should be described in detail to allow the reader to understand how the present invention works. Also, this configuration is only an example. Thus, in this embodiment, additional components other than the light-transmitting plate 1, the image sensor 2 and the image processing section 7 may be implemented as an appropriate combination of known elements.

Hereinafter, the configuration of the image capturing section 100 will be described in detail. In the following description, when a position or direction in the image capturing area is mentioned, the xy coordinates shown in the drawings will be used.

Figure 2:
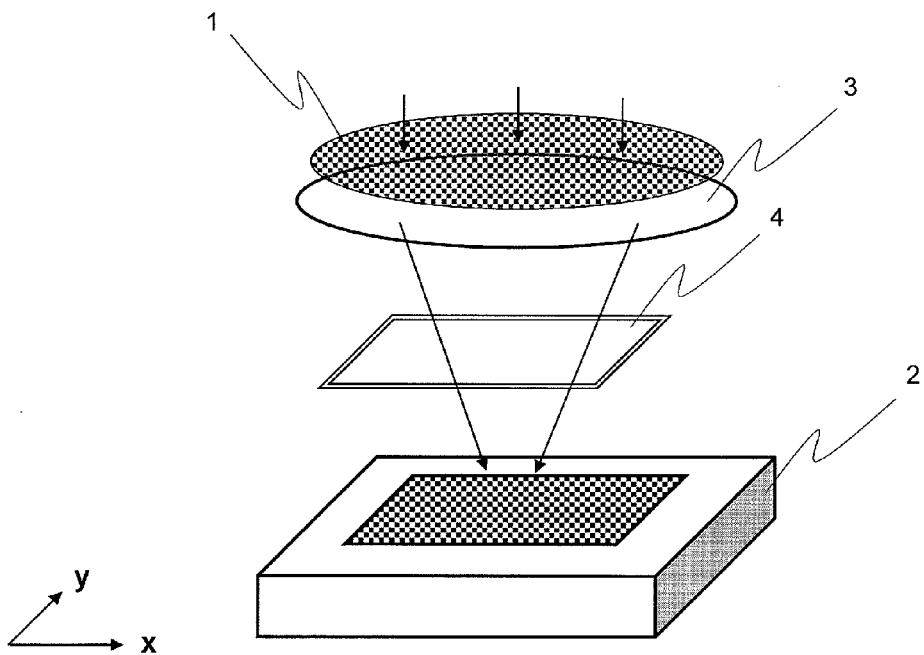
FIG. 2 A schematic representation illustrating an imaging area according to an exemplary embodiment.

FIG. 2 schematically illustrates the relative arrangement of the optical lens 3, infrared cut filter 4, light-transmitting plate 1, and image sensor 2 in the image capturing section 100. The optical lens 3 does not have to be a single lens but may be a lens unit comprised of groups of lenses. But the optical lens 3 is drawn in FIG. 2 as a single lens for the sake of simplicity. The optical lens 3 is a known lens and condenses the incoming light and images the light on the image capturing section of the image sensor 2. It should be noted that the relative arrangement of the respective members shown in FIG. 2 is only an example and does not always have to be adopted according to the present invention. For example, there is no problem if the positions of the optical lens 3 and the infrared cut filter 4 are exchanged with each other. Also, the optical lens 3 and the light-transmitting plate 1 may be integrated with each other. Furthermore, although the infrared cut filter 4 is provided according to this embodiment because a visible radiation image is supposed to be captured, the infrared cut filter 4 would be unnecessary in an application in which an infrared image needs to be obtained (e.g., in a night surveillance camera).

Figure 3A:
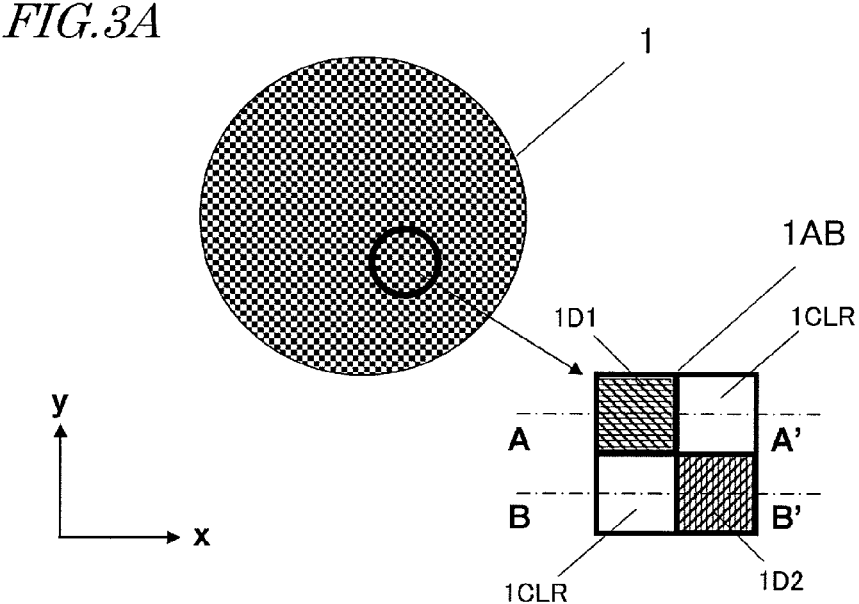
FIG. 3A A plan view illustrating a light-transmitting plate according to a first exemplary embodiment.

FIG. 3A is a plan view of the light-transmitting plate 1, on which arranged is a diffraction grating area in a checkerboard pattern. As shown in FIG. 3A, the diffraction grating area of the light-transmitting plate 1 includes a plurality of basic arrangements 1AB which are arranged two-dimensionally. Each of those basic arrangements 1AB consists of four regions which are arranged in two columns and two rows. In each basic arrangement 1AB, a diffraction region 1D1 which forms part of the diffraction grating is arranged at the row 1, column 1 position, transparent regions 1CLR which form parts of a transparent member are arranged at the row 1, column 2 position and row 2, column 1 position, and another diffraction region 1D2 which forms part of the diffraction grating is arranged at the row 2, column 2 position.

This light-transmitting plate 1 may have a size of 10 mm to 30 mm in diameter, and each basic arrangement 1AB may have a size of 100 µm square to 1000 µm square, for example. However, these sizes are just an example, and do not have to be adopted as long as the functions to be described later are realized.

The diffraction region 1D1 is a blazed grating which is designed so as to tilt the incoming light γ degrees with respect to the horizontal direction (x direction). The diffraction region 1D2 is also a blazed grating which is designed so as to tilt the incoming light −γ degrees with respect to the horizontal direction. In addition, polarization filters (which form parts of a polarization area) are stacked on these diffraction regions 1D1 and 1D2. The transparent regions 1CLR may be made of a transparent member such as glass, plastic or cellophane.

Figure 3B:
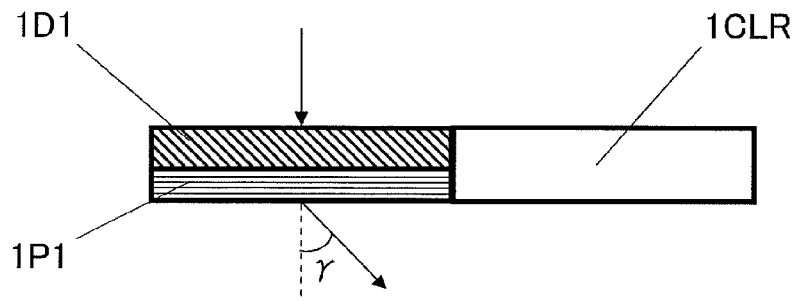
FIG. 3B A cross-sectional view as viewed on the plane A-A' shown in FIG. 3A.
Figure 3C:
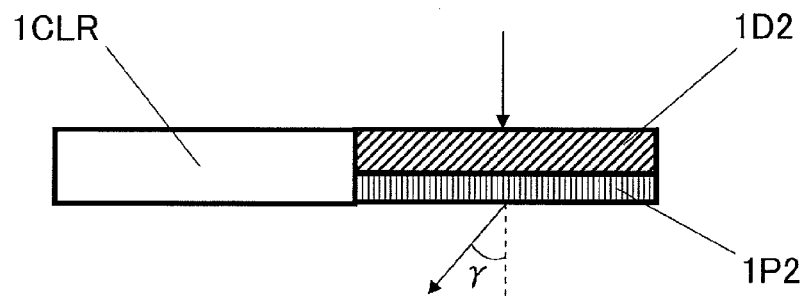
FIG. 3C A cross-sectional view as viewed on the plane B-B' shown in FIG. 3A.

FIG. 3B is a cross-sectional view as viewed on the plane A-A' shown in FIG. 3A, and FIG. 3C is a cross-sectional view as viewed on the plane B-B' shown in FIG. 3A. As shown in FIG. 3B, a polarization filter 1P1 is stacked on the back of the diffraction region 1D1 (i.e., to face the image sensor 2). Likewise, as shown in FIG. 3C, a polarization filter 1P2 is stacked on the back of the diffraction region 1D2. The polarization transmission axis directions (i.e., polarization directions) of these polarization filters 1P1 and 1P2 are different from each other by 90 degrees. In FIGS. 3B and 3C, the diffraction regions 1D1 and 1D2 are illustrated as having a rectangular cross section for the sake of simplicity. Actually, however, such a blazed grating has a saw-tooth cross section. By designing the shape appropriately, diffracted light can be output toward a particular direction. Optionally, contrary to the configuration shown in FIGS. 3B and 3C, the diffraction regions 1D1 and 1D2 may be arranged on the back of the polarization filters 1P1 and 1P2, respectively.

In FIGS. 3B and 3C, illustrated is an exemplary light ray which is incident perpendicularly onto, and gets diffracted by, the diffraction region 1D1, 1D2. In this embodiment, the diffraction regions 1D1 and 1D2 are designed so as to produce mostly a first-order diffracted light ray with almost no diffracted light rays of other orders. That is why the first-order diffracted light ray goes out in the direction indicated by the arrow in FIGS. 3B and 3C. It should be noted that the diffraction regions 1D1 and 1D2 do not have to have such a property but may produce diffracted light rays of other orders as well. Alternatively, second-order diffracted light rays or light rays of any other order may go out mostly from the diffraction regions 1D1 and 1D2, instead of the first-order diffracted light rays.

Figure 4:
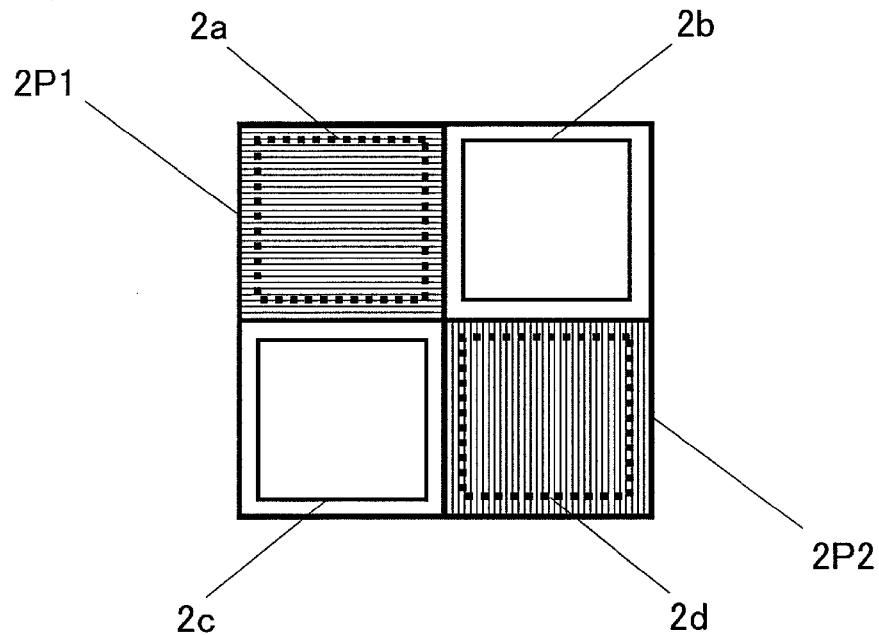
FIG. 4 illustrates a basic pixel arrangement for an image sensor according to the exemplary embodiment.

FIG. 4 is a plan view illustrating a basic pixel arrangement for the image sensor 2. As shown in FIG. 4, the image sensor 2 of this embodiment has a basic pixel arrangement including four photosensitive cells 2a, 2b, 2c and 2d that are arranged in two columns and two rows. A polarization filter 2P1 is arranged to face the photosensitive cell 2a at the row 1, column 1 position, and a polarization filter 2P2 is arranged to face the photosensitive cell 2d at the row 2, column 2 position. But no polarization filters are arranged over the photosensitive cell 2b at the row 1, column 2 position and over the photosensitive cell 2c at the row 2, column 1 position. The polarization filters 2P1 and 2P2 have polarization directions that are different from each other by 90 degrees. Also, the polarization directions of these polarization filters 2P1 and 2P2 are different from those of the polarization filters 1P1 and 1P2 by the angle θ.

Figure 5:
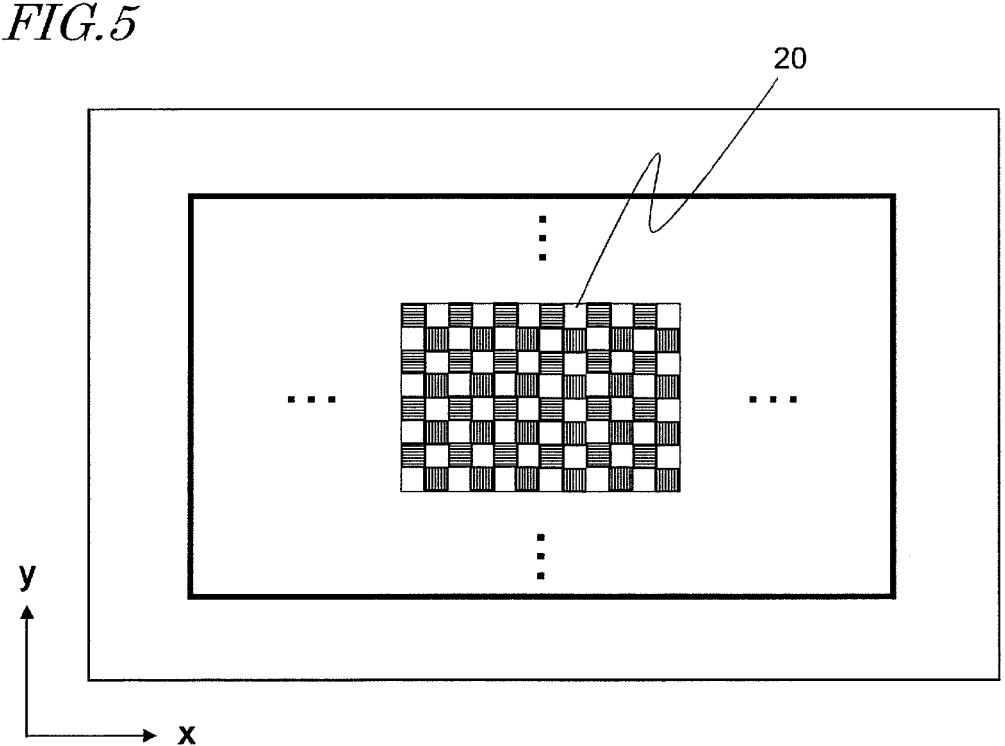
FIG. 5 A plan view illustrating an image sensor according to the exemplary embodiment.

FIG. 5 is a plan view schematically illustrating a part of a photosensitive cell array 20 comprised of multiple photosensitive cells that are arranged in columns and rows on the imaging area of the image sensor 2 and an array of polarization filters which are arranged over the photosensitive cell array 20. Each of those photosensitive cells typically includes a photodiode, which performs photoelectric conversion and outputs a photoelectrically converted signal representing the quantity of the light received. In this embodiment, the photosensitive cells 2a through 2d which are arranged in two columns and two rows and polarization filters 2P1 and 2P2 which face them form a single unit element, and a plurality of such unit elements are arranged two-dimensionally on the imaging area.

By adopting such a configuration, the light that has entered this image capture device during exposure passes through the light-transmitting plate 1, the lens 3 and the infrared cut filter 4, gets imaged on the imaging area of the image sensor 2, and then is photoelectrically converted by the photosensitive cells 2a through 2d. And based on the photoelectrically converted signals thus obtained, the image generating section 7a of the image processing section 7 generates an image.

Figure 6A:
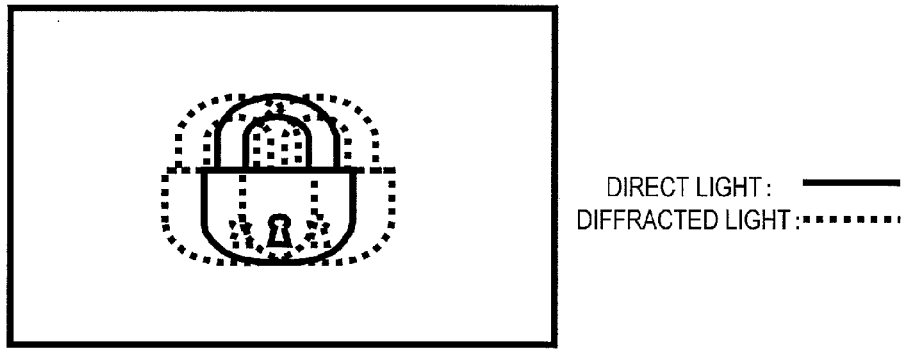
FIG. 6A A schematic representation illustrating an example of images obtained by capturing according to the exemplary embodiment.

FIG. 6A schematically illustrates what images will be obtained by capturing. Specifically, in the example illustrated in FIG. 6A, a lock has been captured, the solid line indicates an image produced by the light that has come directly from the subject, and the dotted line indicates images produced by the diffracted light. Thus, the resultant image can be said to be a synthetic image of the image produced by the direct light and the two images produced by the diffracted light. In this case, the "light produced by the direct light" refers herein to an image to be produced by the light that has passed through the transparent regions 1CLR of the light-transmitting plate 1. On the other hand, the "images produced by the diffracted light" refer herein to the images to be produced by the first-order diffracted light rays that have gone out through the diffraction regions 1D1 and 1D2 of the light-transmitting plate 1. In the following description, the image produced by the direct light will be sometimes referred to herein as a "direct light image" and the two images produced by the diffracted light rays will be sometimes referred to herein as "diffracted light images".

In the schematic representation shown in FIG. 6A, the diffracted light images have shifted horizontally (laterally on the paper) with respect to the direct light image. This shift has been caused because the diffracted light ray going out through the diffraction region 1D1 is tilted in the +x direction and the diffracted light ray going out through the diffraction region 1D2 is tilted in the −x direction. Also, since the two diffraction regions 1D1 and 1D2 are configured so that those diffracted light rays will be incident on the imaging area at respective points that are symmetric to the points of incidence of the light rays that have been transmitted through the transparent regions 1CLR, those two diffracted light images will appear symmetrically with respect to the direct light image. The shift of the diffracted light images with respect to the direct light image depends on the distance from the light-transmitting plate 1 to the subject. That is to say, the longer the distance to the subject, the greater the magnitude of shift. That is why by detecting the magnitude of horizontal shift of the diffracted light images with respect to the direct light image, the subject distance can be obtained.

In this embodiment, information indicating the correlation between the magnitudes of the horizontal shift of the diffracted light images and the subject distance is stored in advance as a table or a function on a storage medium such as the memory 30. By reference to that correlation, the depth information generating section 7b of the image processing section 7 can calculate the subject distance based on the magnitude of shift. Optionally, the correlation may be obtained by performing test shooting sessions a number of times with the subject distance changed.

Next, signal processing according to this embodiment will be described. In the following description, the output signals obtained as a result of the photoelectric conversion by the photosensitive cells 2a, 2b, 2c and 2d will be identified by S2a, S2b, S2c and S2d, respectively. In this example, the incoming light is supposed to be non-polarized light and the diffraction regions 1D1 and 1D2 are supposed to diffract the incoming light 100% for the sake of simplicity. Also, the quantities (or intensities) of light rays that would be incident on a single photosensitive cell through the transparent regions 1CLR and the diffraction regions 1D1 and 1D2, were it not for the polarization filters 1P1, 1P2, 2P1 and 2P2, will be identified herein by D0, D1 and D2, respectively, which are supposed to be quantities per unit area of the light-transmitting plate 1. Furthermore, the transmittance in a situation where non-polarized light enters the polarization filters 1P1, 1P2, 2P1 and 2P2 will be identified herein by T1 and the transmittance in a situation where light that is polarized in the same direction as the polarization direction of a polarization filters enters that polarization filter will be identified herein by T2. That is to say, the transmittance in a situation where non-polarized light enters two polarization filters with the same polarization direction is represented by T1×T2. T1 and T2 are real numbers that satisfy 0<T1<1 and 0<T2<1.

During the exposure, the light that has come from the subject is transmitted through the light-transmitting plate 1 first. The transparent regions 1CLR account for a half of the overall area of the light-transmitting plate 1 and the diffraction regions 1D1 and 1D2 account for a quarter of the overall area of the light-transmitting plate 1. Since the polarization filters 1P1 and 1P2 are stacked on the diffraction regions 1D1 and 1D2, respectively, the transmittance of the diffraction regions 1D1 and 1D2 is determined by that of the polarization filters 1P1 and 1P2 and represented by T1. That is why light, of which the quantity is proportional to D0/2+T1 (D1+D2)/4, is incident on the photosensitive cells 2b and 2c, over which no polarization filters are arranged, and the photosensitive cells 2b and 2c output photoelectrically converted signals, of which the level is proportional to this quantity.

As for the photosensitive cell 2a on which the polarization filter 2P1 is stacked, on the other hand, if non-polarized light has entered, the quantity of the light transmitted is limited to T1 times as large as that of the incoming light due to the influence of the polarization filter 2P1. Actually, however, the light that enters the polarization filter 2P1 includes a light ray which has come from the subject and been transmitted through the transparent regions 1CLR and of which the quantity is proportional to D0/2, a light ray which has been transmitted through the diffraction region 1D1 and the polarization filter 1P1 and of which the quantity is proportional to (D1× T1×cos$^2$θ)/4, and a light ray which has been transmitted through the diffraction region 1D2 and the polarization filter 1P2 and of which the quantity is proportional to (D2×T1×

$\sin^2\theta)/4$. Consequently, the photosensitive cell 2a generates a signal which is proportional to $(D0\times T1)/2+(D1\times T1\times \cos^2\theta \times T1)/4+(D2\times T1\times \sin^2\theta \times T2)/4$.

Likewise, as for the photosensitive cell 2d on which the polarization filter 2P2 is stacked, if non-polarized light has entered, the quantity of the light transmitted is limited to T1 times as large as that of the incoming light due to the influence of the polarization filter 2P2. Actually, however, the light that enters the polarization filter 2P2 includes a light ray which has come from the subject and been transmitted through the transparent regions 1CLR and of which the quantity is proportional to D0/2, a light ray which has been transmitted through the diffraction region 1D1 and the polarization filter 1P1 and of which the quantity is proportional to $(D1\times T1\times \sin^2\theta)/4$, and a light ray which has been transmitted through the diffraction region 1D2 and the polarization filter 1P2 and of which the quantity is proportional to $(D2\times T1\times \cos^2\theta)/4$. Consequently, the photosensitive cell 2d generates a signal which is proportional to $(D0\times T1)/2+(D1\times T1\times \sin^2\theta \times T1)/4+(D2\times T1\times \cos^2\theta \times T2)/4$.

If the constant of proportionality between the quantity of light incident on each pixel of the image sensor 2 and the signal generated is supposed to be one, S2a, S2b (=S2c), and S2d can be represented by the following Equations (1) to (3), respectively. Furthermore, these Equations (1) to (3) can also be represented by Equation (4) using a matrix. In Equation (4), only the right side of Equations (1) to (3) is multiplied by four.

$$S2a = T1\left(\frac{1}{2}D0 + \frac{1}{4}T2\cos^2\theta \times D1 + \frac{1}{4}T2\sin^2\theta \times D2\right) \quad (1)$$

$$S2b = S2c = \frac{1}{2}D0 + \frac{1}{4}T1 \times D1 + \frac{1}{4}T1 \times D2 \quad (2)$$

$$S2d = T1\left(\frac{1}{2}D0 + \frac{1}{4}T2\sin^2\theta \times D1 + \frac{1}{4}T2\cos^2\theta \times D2\right) \quad (3)$$

$$\begin{pmatrix} S2a \\ S2b \\ S2d \end{pmatrix} = \begin{pmatrix} 2T1 & T1T2\cos^2\theta & T1T2\sin^2\theta \\ 2 & T1 & T1 \\ 2T1 & T1T2\sin^2\theta & T1T2\cos^2\theta \end{pmatrix} \begin{pmatrix} D0 \\ D1 \\ D2 \end{pmatrix} \quad (4)$$

If both sides of Equation (4) are multiplied from the left by the inverse matrix of the 3×3 matrix of Equation (4), the following Equation (5) can be obtained:

$$\begin{pmatrix} D0 \\ D1 \\ D2 \end{pmatrix} = \begin{pmatrix} 2T1 & T1T2\cos^2\theta & T1T2\sin^2\theta \\ 2 & T1 & T1 \\ 2T1 & T1T2\sin^2\theta & T1T2\cos^2\theta \end{pmatrix}^{-1} \begin{pmatrix} S2a \\ S2b \\ S2d \end{pmatrix} \quad (5)$$

By using the 3×3 inverse matrix and pixel signals S2a to S2d in Equation (5), an image signal D0 representing the direct light that has come from the subject and image signals D1 and D2 representing the diffracted light can be obtained. That is to say, by using this Equation (5), the image signals S2a to S2d that have been obtained by capturing can be divided into an image represented by the direct light signal D0 and two images represented by the diffracted light signals D1 and D2. In the following description, images based on these signals D0, D1 and D2 will be sometimes referred to herein as a "D0 image", a "D1 image" and a "D2 image", respectively, for the sake of simplicity.

These processing steps are carried out by the image generating section 7a of the image processing section 7. The photoelectrically converted signal that has been output from each photosensitive cell is sent to the signal processing section 200 via the signal generating and receiving section 5 and passed to the image generating section 7a. In response, the image generating section 7a performs the arithmetic processing described above, thereby calculating the direct light signal D0 and diffracted light signals D1, D2 on a unit element basis and generating a direct light image and two diffracted light images.

As can be seen, according to this embodiment, the direct light image and the two diffracted light images can be separated from each other. Thus, the subject's depth information can be obtained by using these images. In addition, the D0 image generated based on the direct light may be processed as an ordinary image with a minimized decrease in resolution.

The depth information is calculated by the depth information generating section 7b of the image processing section 7. In this embodiment, the image to be formed by the direct light signal D0 and the two images to be formed by the diffracted light signals D1 and D2 are treated as pseudo-color images. More specifically, the D0, D1 and D2 images are treated as green (G), red (R) and blue (B) images, respectively, and white balance and colorization processing is carried out on these color images. And the D1 and D2 images are shifted toward the D0 image (i.e., horizontally) so that the result of the colorization becomes closer to the color white, and the magnitude of shift between the respective images is detected. This is based on the principle that if the images based on D0, D1 and D2 were the same image with no shift at all, no coloring should be produced even if the white balance was struck and if the colorization processing was carried out.

Hereinafter, a specific example of the processing of obtaining depth information by calculating the magnitudes of shift of the D1 and D2 images with respect to the D0 image will be described. In the example to be described below, the image shown in FIG. 6A is supposed to be obtained as a result of the image capturing session.

First of all, the depth information generating section 7b generates color images using the D0, D1 and D2 images as green (G), red (R) and blue (B) images, respectively, and strikes a white balance. During this processing, red-based and blue-based white balance coefficients α0 and β0 are determined. This processing can be represented by the following numerical expressions (that are Equations (6) and (7)), in which D0 (x, y), D1 (x, y), and D2 (x, y) represent signal values at the pixel location (x, y) on the D0, D1 and D2 images, respectively, and Σ represents the sum calculated for every pixel:

$$\alpha 0 = \Sigma D1(x,y)/\Sigma D0(x,y) \quad (6)$$

$$\beta 0 = \Sigma D2(x,y)/\Sigma D0(x,y) \quad (7)$$

Next, using these white balance coefficients α0 and β0, Cr (x, y) and Cb (x, y) represented by the following Equations (8) and (9) are generated as colors red and blue signals, respectively:

$$Cr(x,y) = D1(x,y) - \alpha 0 \times D0(x,y) \quad (8)$$

$$Cb(x,y) = D2(x,y) - \beta 0 \times D0(x,y) \quad (9)$$

And the sum Cs of the absolute values of the signals Cr and Cb is calculated by making the arithmetic operation given by the following Equation (10):

$$Cs = \Sigma|Cr(x,y)| + \Sigma|Cb(x,y)| \quad (10)$$

The signal Cs is used as an index indicating the degrees of color shift of the D1 and D2 images with respect to the D0 image. The depth information generating section 7b shifts these two diffracted light images in the direction of the direct light image on a pixel by pixel basis, and repeatedly performs the arithmetic operations represented by Equations (8) to (10) every time the images are shifted. This processing is carried out until Cs becomes minimum.

If Cs becomes minimum, it means that the shift between the three images is minimum. The depth information generating section 7b defines the total number of pixels that have been shifted from the initial state through the state in which the color shift has become minimum to be the magnitude of shift of the D1 and D2 images. And based on that magnitude of shift and by reference to the correlation information that has been stored in advance as a table or a function in the memory 30, the depth information generating section 7b determines the distance from the image capture device to the subject (i.e., depth information).

Figure 6B:
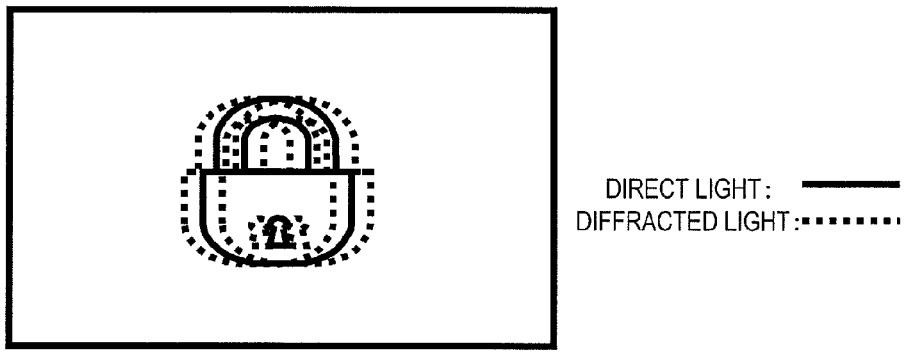
FIG. 6B A schematic representation illustrating a state where two diffracted light images are shifted toward a direct light image.
Figure 6C:
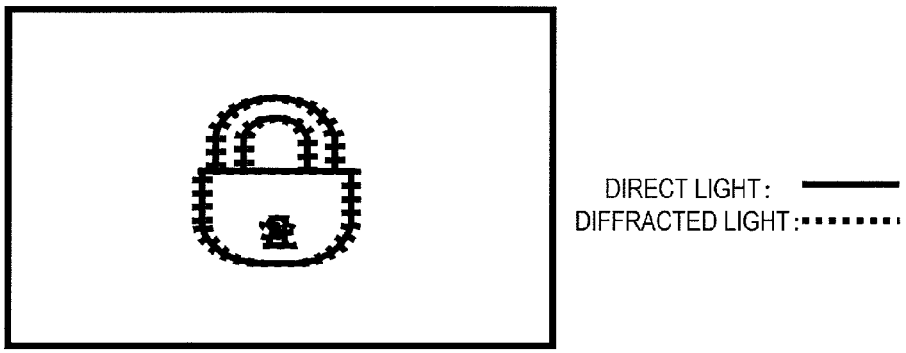
FIG. 6C A schematic representation illustrating a state where the two diffracted light images are further shifted toward, and substantially superposed on, the direct light image.

FIG. 6B illustrates how this processing is still in progress. As can be seen from FIG. 6B, the diffracted light images have become closer to the direct light image compared to the initial state. And FIG. 6C illustrates how the color shift has become minimum, i.e., how the three images have been matched to each other almost completely. If the processing described above is carried out with the images such as the ones shown in FIGS. 6A through 6C presented on the display device, the user can see visually the degree of matching between these images. As a result, the matching processing can be carried out more easily than previously.

Figure 7A:
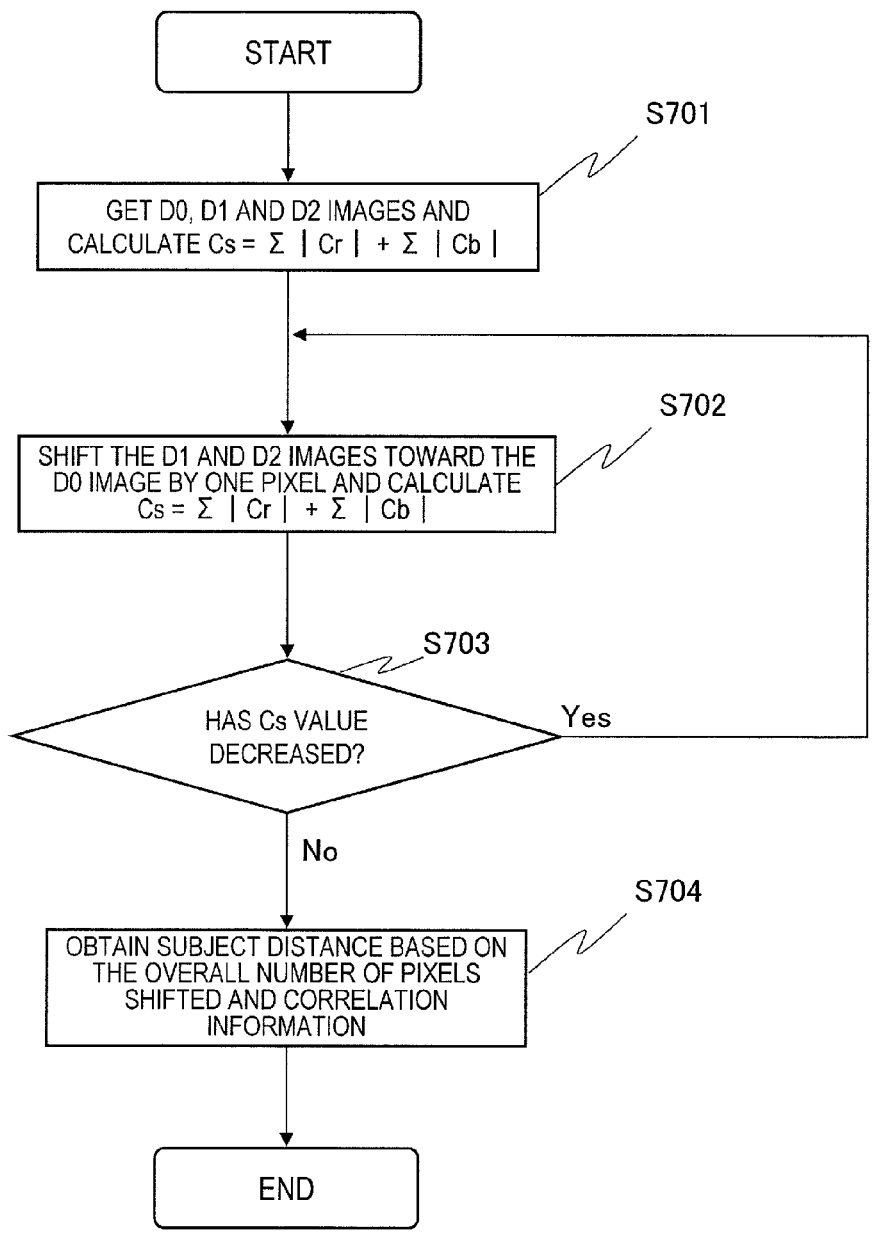
FIG. 7A A flowchart showing a procedure of depth information generation processing according to the first exemplary embodiment.

FIG. 7A is a flowchart showing the procedure of the depth information calculation processing described above. First of all, in Step S701, the depth information generating section 7b retrieves the D0, D1 and D2 images that have been generated by the image generating section 7a from the memory 30 and calculates the signal Cs represented by Equation (10). In this processing step, instead of processing the D0, D1 and D2 images as they are, the processing may be carried out only on their cropped image area including the subject that is the object of depth estimation. In that case, the number of processing steps to perform can be reduced, too. Next, in Step S702, with the D1 and D2 images shifted toward the D0 image by one pixel, the signal Cs is calculated again. Subsequently, in Step S703, the decision is made whether or not the Cs value has decreased from the previous one. If the answer is YES, the processing step S702 is performed all over again and the same calculation is made once again with the D1 and D2 images inched toward the D0 image by one more pixel. And this series of processing steps is carried out over and over again until it turns out in Step S703 that the Cs value has started to increase (i.e., until the decision is made that the Cs value has reached its minimum value). If the Cs value has started to increase, the process advances to Step S704, in which the depth information generating section 7b generates subject's depth information based on the total number of pixels shifted so far and by reference to the correlation information. In this case, the "depth information" is a piece of information indicating the distance from the image capture device to the subject at the time of shooting and may be a numerical value or sign representing that distance.

Figure 8:
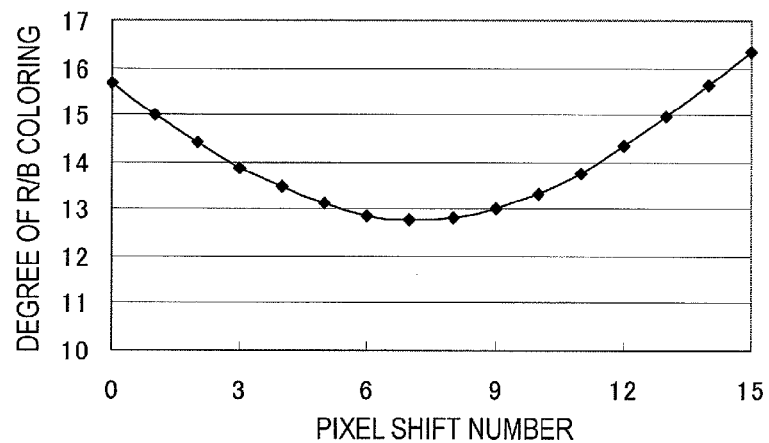
FIG. 8 A graph showing an exemplary relation between the pixel shift number and the degree of R/B coloring according to the first exemplary embodiment.

FIG. 8 shows an exemplary relation between the number of pixels shifted (which will be referred to herein as "the pixel shift number") and the signal Cs (which will be referred to herein as "degree of R/B coloring"). In this example, the degree of R/B coloring becomes minimum when the number of pixels shifted is seven. Consequently, the shift number of seven is defined to be the magnitude of shift.

By performing these processing steps, the depth information can be obtained. Even though the D1 and D2 images are supposed to be shifted by one pixel each time in the example described above, the number of pixels shifted at a time does not have to be one but may also be two or more. Also, in the example described above, the depth information generating section 7b automatically performs the processing of shifting the D1 and D2 images over and over again until Cs becomes minimum. However, this processing may also be performed in accordance with a user's instruction. For example, the user may specify the number of pixels shifted and the results may be presented on the display screen. Alternatively, the user may perform this operation of gradually shifting the D1 and D2 images toward the D0 image by him- or herself while checking out the monitor screen, and the results may be sequentially presented on the display screen. In that case, if the depth information generating section 7b is configured to indicate that the Cs value has become minimum as soon as that happens and to present the magnitudes of shift of the diffracted light images and the magnitude of depth calculated on the screen, such an image capture device would come in very handy.

In the processing described above, the signal Cs in Equation (10) represents the magnitude of color shift of the overall image, and does not accurately represent the magnitude of shift of a portion of the image including a particular subject. That is why the magnitude of shift of a particular subject could not be determined accurately just by performing the processing described above. For that reason, the depth information generating section 7b of this embodiment may further perform the following additional processing.

FIG. 7B is a flowchart showing the procedure of this additional processing. If the answer to the query of the processing step S703 shown in FIG. 7A is NO, the depth information generating section 7b divides in Step S801 each of the D0, D1 and D2 images by M horizontally and by N vertically (where M and N are integers that are equal to or greater than two), thereby forming M×N partial images. Each image may be divided into approximately 100×100 partial images. In the following description, the partial images of the D0, D1 and D2 images will be identified herein by zD0 $(x, y)$, zD1 $(x, y)$ and zD2 $(x, y)$, respectively, where z indicates the number of the partial image and z=1 to M×N.

Next, in Step S802, using the white balance coefficients $\alpha 0$ and $\beta 0$ that have already been calculated, the depth information generating section 7b chooses a combination of partial images with the smallest degree of coloring while changing the combinations of the D0, D1 and D2 images one after another. Specifically, first of all, the depth information generating section 7b performs the same arithmetic operations as the ones represented by Equations (8) and (9) on the chosen combination of the partial images. That is to say, ijCr (x, y) and ikCb (x, y) given by the following Equations (11) and (12) are generated as color signals. In Equations (11) and (12), i, j and k are positive integers, the number of the partial image z=i, j, k, and the partial images of the D0, D1 and D2 images are identified by iD0 $(x, y)$, jD1 $(x, y)$ and kD2 $(x, y)$, respectively.

$$ijCr(x,y)=jD1(x,y)-\alpha 0\times iD0(x,y) \quad (11)$$

$$ikCb(x,y)=kD2(x,y)-\beta 0\times iD0(x,y) \quad (12)$$

And the sum ijkCs of the absolute values of the signals ijCr and ikCb is obtained by making the arithmetic operation represented by the following Equation (13). It should be noted that the summation $\Sigma$ in Equation (13) is carried out on every pixel included in the partial images:

$$ijkCs=\Sigma|ijCr(x,y)|+\Sigma|ikCb(x,y)| \quad (13)$$

The depth information generating section 7b calculates ijkCs with the combinations (i, j, k) changed and chooses a combination of the partial images that minimizes its value. As to the combination of partial images that has been chosen in this manner, the magnitude of shift in the x direction of the partial image of the D1 or D2 image with respect to that of the D0 image is added to the magnitude of shift that has been obtained in advance, and the sum is regarded as the final magnitude of shift.

Next, in Step S803, the depth information generating section 7b performs the same arithmetic operations as what is represented by Equations (6) and (7) all over again on the chosen combination of partial images, thereby determining white balance coefficients α0 and β0. The coefficients α0 and β0 that have been obtained previously have been determined with respect to the entire image, and are not ideal coefficients. That is to say, the D1 or D2 image has shifted either to the right or to the left with respect to the D0 image, and either the left- or right-end portion of the D1 or D2 image does not exist in the D0 image. That is why α0 and β0 that have been obtained previously do involve errors. Even if a synthetic image is generated using non-ideal white balance coefficients α0 and β0, such a synthetic image does not exactly have the color white. For that reason, the depth information generating section 7b obtains more accurate white balance coefficients α0 and β0 based on the partial images chosen. Since the partial images that have been cropped out of D0, D1 and D2 are all related to the same subject portion, α0 and β0 obtained from these partial images are more ideal coefficients than the one that have been obtained previously.

Subsequently, in the next processing step S804, the depth information generating section 7b calculates Cs all over again with respect to the entire image by Equation (10) using the white balance coefficients α0 and β0 that have been determined once again. If it turns out, in Step S805, that the result of the calculation is smaller than a predetermined threshold value, the decision is made that it is "OK". On the other hand, if the result of the calculation turned out to be equal to or greater than the threshold value, then the decision is made that it is "NG". If the decision is "OK", the depth information generating section 7b adds the magnitude of shift in the x direction of the partial image of the D1 or D2 image with respect to that of the D0 image in Step S806 to the magnitude of shift that has been obtained in advance, and regards the sum as the final magnitude of shift. Then, in Step S807, the depth information generating section 7b calculates the depth information of the subject of interest based on that magnitude of shift.

If the decision made in Step S805 is "NG", then the depth information generating section 7b displays in Step S808 a message saying that the depth information cannot be obtained on the screen. Optionally, instead of displaying such a message on the screen, distance information based on the total number of pixels that has been obtained in Step S704 shown in FIG. 7A may be output as well.

In this manner, the depth information generating section 7b performs color image processing and determines depth information using three images. By obtaining the magnitude of shift of the diffracted light image with respect to the direct light image, the subject's relative depth information can be calculated.

As can be seen, according to this embodiment, by providing an optical regions (i.e., the light-transmitting plate 1) in which diffraction gratings 1D1 and 1D2 and polarization filters 1P1 and 1P2 are stacked one upon the other for the image capturing optical system and by arranging pixels with polarization filters 2P1 and 2P2 on the image sensor 2, too, an image produced by the light that has come directly from the subject and an image produced by diffracted light can be captured so as to superpose one upon the other. And by performing arithmetic processing between pixels, those images can be separated from each other. Furthermore, by performing white balance and colorization processing on an appropriate combination of partial images that have been cropped out of those separated images, the magnitude of shift between the image produced by the direct light and the image produced by the diffracted light can be calculated. As a result, the subject's depth information can be obtained.

Figure 9A:
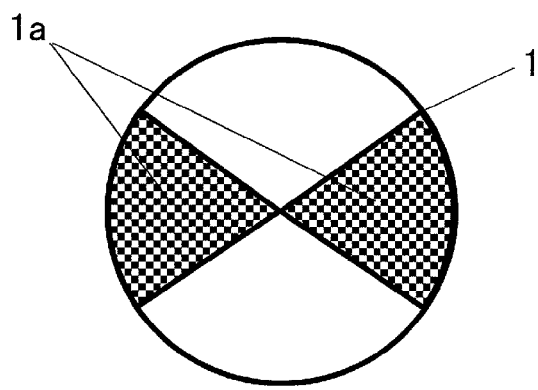
FIG. 9A A plan view illustrating a modified example of the light-transmitting plate according to the exemplary embodiment.
Figure 9B:
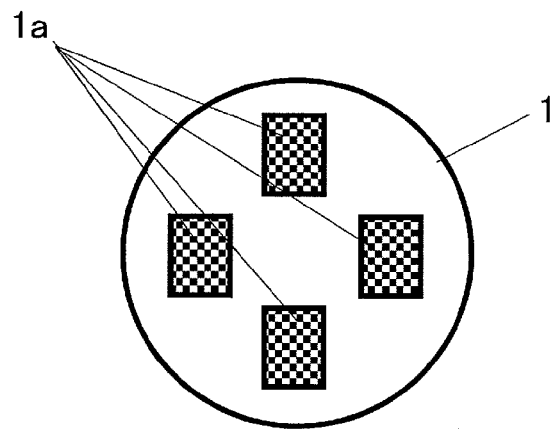
FIG. 9B A plan view illustrating another modified example of the light-transmitting plate according to the exemplary embodiment.

In the embodiment described above, the light-transmitting plate 1 is supposed to be configured so that the diffraction regions 1D1 and 1D2 are arranged all over the light-transmitting plate 1 as shown in FIG. 3A. However, this is just an example. Alternatively, the diffraction regions may be divided into two connected areas 1a as shown in FIG. 9A. Still alternatively, the diffraction regions may also be divided into three or more separate areas 1a as shown in FIG. 9B. In those cases, each of those areas 1a is comprised of multiple basic arrangements 1AB as in the light-transmitting plate 1 shown in FIG. 3A and the rest of the light-transmitting plate 1a other than the areas 1a is transparent regions. If such a configuration is adopted, the quantity of the diffracted light decreases but the quantity of the direct light increases compared to the configuration shown in FIG. 3A. That is why such a configuration is suitably used when an ordinary image needs to be obtained with high sensitivity. It should be noted that even in such an example, the basic arrangement 1AB of the light-transmitting plate 1 does not have to be a matrix of two rows by two columns, either.

Furthermore, in the embodiment described above, two polarization filters, of which the polarization directions intersect with each other at right angles, are supposed to be used as the polarization filters 1D1 and 1D2. However, the polarization directions of the polarization filters do not have to intersect with each other at right angles as long as the relations similar to the ones represented by Equations (4) and (5) are satisfied. The same can be said about the polarization filters 2D1 and 2D2 of the image sensor 2. That is to say, their polarization directions do not have to define right angles, either. If the angle defined by the polarization transmission axes of the polarization filters 1D1 and 1D2 of the light-transmitting plate 1 is represented by $\phi 1$ and if the angle defined by the polarization transmission axes of the polarization filters 2D1 and 2D2 of the image sensor 2 is represented by $\phi 2$ by generalizing the configuration described above, Equations (4) and (5) may be modified into the following Equations (14) and (15), respectively:

$$\begin{pmatrix} S2a \\ S2b \\ S2d \end{pmatrix} = \begin{pmatrix} 2T1 & T1T2\cos^2\theta & T1T2\cos^2(\theta - \phi1) \\ 1 & T1 & T1 \\ 2T1 & T1T2\cos^2(\theta + \phi2) & T1T2\cos^2(\theta + \phi2 - \phi1) \end{pmatrix} \begin{pmatrix} D0 \\ D1 \\ D2 \end{pmatrix} \quad (14)$$

$$\begin{pmatrix} D0 \\ D1 \\ D2 \end{pmatrix} = \begin{pmatrix} 2T1 & T1T2\cos^2\theta & T1T2\cos^2(\theta - \phi1) \\ 1 & T1 & T1 \\ 2T1 & T1T2\cos^2(\theta + \phi2) & T1T2\cos^2(\theta + \phi2 - \phi1) \end{pmatrix}^{-1} \begin{pmatrix} S2a \\ S2b \\ S2d \end{pmatrix} \quad (15)$$

Since the angles θ, $\phi 1$ and $\phi 2$ are already known, the image generating section 7a can generate the D0, D1 and D2 images by performing the arithmetic operation based on Equation (15) on each and every unit element of the image sensor 1.

In addition, each of the light-transmitting plate 1 and the image sensor 2 may have only one kind of polarization filters, instead of the two kinds of filters. In that case, the light-transmitting plate 1 may have only a single kind of diffraction regions. Nevertheless, in that case, the 3×3 matrix of Equation (4) needs to be replaced with a 2×2 matrix. Suppose, as a simple example, a situation where the polarization filters 1P2 and 1P1 have the same property in FIG. 3A and the polarization filters 2P2 and 2P1 have the same property in FIG. 4A. In that case, in the image sensor 2, the processing can be carried out on the basis of pixels in one row by two columns or in two rows by one column, and Equations (4) and (5) can be rewritten into the following Equations (16) and (17), respectively:

$$\begin{pmatrix} S2a \\ S2b \end{pmatrix} = \begin{pmatrix} T1 & T1T2\cos^2\theta \\ 1 & T1 \end{pmatrix} \begin{pmatrix} D0 \\ D1 \end{pmatrix} \quad (16)$$

$$\begin{pmatrix} D0 \\ D1 \end{pmatrix} = \begin{pmatrix} T1 & T1T2\cos^2\theta \\ 1 & T1 \end{pmatrix}^{-1} \begin{pmatrix} S2a \\ S2b \end{pmatrix} \quad (17)$$

In this case, the image generating section 7a can obtain an image produced by the direct light and an image produced by the diffracted light by calculating the signals D0 and D1 by Equation (17). When the colorization processing is carried out after that, there is no problem if the diffracted light image is used as a magenta (that is the mixture of the colors red and blue) image. In that case, the depth information generating section 7b may calculate the signal Cs represented by Equation (10) while shifting the D1 image that is produced by the diffracted light horizontally toward the D0 image with D1 (x, y)=D2 (x, y), α0=β0 and Cr (x, y)=Cb (x, y) satisfied in Equations (6) to (9). The same can be said about the processing shown in FIG. 7B, too.

Also, as for the polarization filters of the image sensor 2, their basic arrangement does not have to have the checkerboard pattern but may also be a vertical striped arrangement, a horizontal striped arrangement, or any other suitable arrangement. For example, the polarization filters 2P1 and 2P2 shown in FIG. 4 may be arranged either on the same row or on the same column.

In the embodiment described above, the diffraction regions 1D1 and 1D2 of the light-transmitting plate 1 are supposed to generate mainly first-order diffracted light rays. However, the diffraction regions 1D1 and 1D2 may also be configured to generate mainly diffracted light rays of any other order, too. In this description, if a diffraction region "mainly generates $n^{th}$-order diffracted light rays (where n is an integer that is equal to or greater than one)", then it means that $n^{th}$-order diffracted light rays account for 80% or more of the overall diffracted light going out of that diffraction region. Each diffraction region is designed so that the $n^{th}$-order diffracted light rays suitably account for 90% or more, more suitably 95% or more, of the overall diffracted light.

Furthermore, in the embodiment described above, the diffraction regions 1D1 and 1D2 are configured so that the point of incidence on the imaging area of the $n^{th}$-order diffracted light ray generated by each of those regions shifts in the x direction with respect to the point of incidence of the light ray that has been transmitted through the transparent region 1CLR. However, this is only an example of the present invention. Alternatively, the diffraction regions 1D1 and 1D2 may also be configured so that the point of incidence of the $n^{th}$-order diffracted light ray on the imaging area shifts in the y direction or obliquely with respect to that of the directly incident light.

Furthermore, even though the D0, D1 and D2 images are supposed to be green, red and blue images, respectively, in the embodiment described above, the colors have been assigned in this manner just for convenience sake, and a combination of any other colors may also be used. As long as those images are treated as images in different colors, any other combination of colors may be adopted as well. For example, processing may also be carried out with the D0 image supposed to be not a green image but a red image and with the D1 and D2 images supposed to be blue and green images, respectively.

Embodiment 2

Hereinafter, a depth estimating image capture device as a second embodiment of the present invention will be described. This embodiment has the same configuration as the first embodiment except the configuration of the light-transmitting plate 1. Thus, the following description of this second embodiment will be focused on differences from the first embodiment, and their common features will not be described all over again.

Figure 10A:
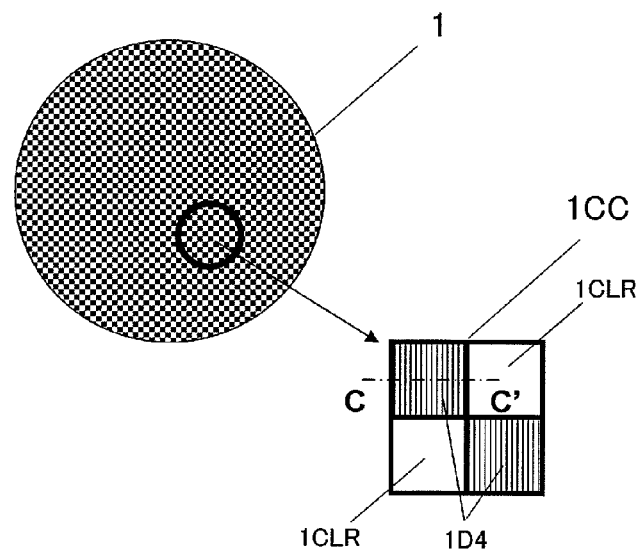
FIG. 10A A plan view illustrating a light-transmitting plate according to a second exemplary embodiment.
Figure 10B:
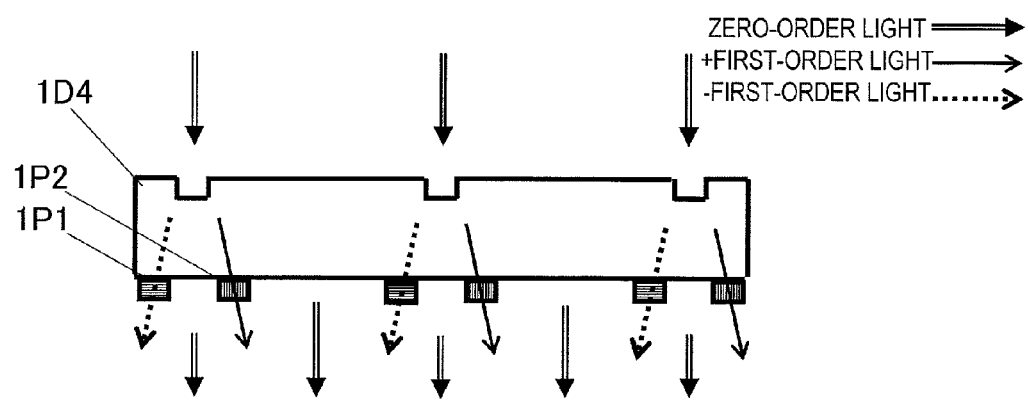
FIG. 10B A cross-sectional view as viewed on the plane C-C' shown in FIG. 10A.

FIG. 10A is a plan view illustrating a light-transmitting plate 1 according to this embodiment. FIG. 10B is a cross-sectional view thereof as viewed along the plane C-C' shown in FIG. 10A. Even though the basic arrangement 1CC of the diffraction grating regions is also supposed to have a checkerboard pattern according to this embodiment, this is not an essential requirement. In the basic arrangement 1CC of the light-transmitting plate 1, diffraction regions 1D4 are arranged at the row 1, column 1 and row 2, column 2 positions and transparent regions 1CLR are arranged at the row 1, column 2 and row 2, column 1 positions. The diffraction regions 1D4 are obtained by cutting linear grooves on a transparent member, and will be referred to herein as "linear diffraction gratings". These diffraction gratings are designed so as to tilt the incoming light ±γ degrees with respect to the horizontal direction. In FIG. 10B, the light that has come directly from the subject is illustrated as "zero-order light rays", light rays which define a tilt angle of γ degrees with respect to the direction of the direct light are illustrated as "+first-order light rays", and light rays which define a tilt angle of –γ degrees with respect to the direction of the direct light are illustrated as "–first-order light rays". Optionally, the diffraction regions 1D4 may also be configured to generate mainly diffracted light rays of any other order instead of the ±first-order light rays.

In this linear diffraction region 1D4, polarization filters 1P1 and 1P2 are stacked one upon the other so as to cover the diffraction region 1D4 only partially. The polarization filters 1P1 and 1P2 are arranged where the ±first-order light rays transmitted through the linear diffraction regions 1D4 pass. The respective polarization directions of the polarization filters 1P1 and 1P2 are supposed in this embodiment to, but do not have to, intersect with each other at right angles. As can be seen, according to this embodiment, two polarization filters 1P1 and 1P2 are arranged for a single groove on the diffraction region 1D4. As a result, the ±first-order light rays get polarized but the zero-order light ray is not polarized but transmitted as it is.

The linear diffraction region 1D4 for use in this embodiment also transmits the zero-order light ray that is the light coming directly from the subject. That is why compared to the configuration of the first embodiment, the levels of the signals of the photosensitive cells 2a and 2d decrease but the levels of the signals of the photosensitive cells 2b and 2c increase. This is equivalent to changing the area ratio of the transparent regions 1CLR and diffraction regions 1D1 and 1D2 in the light-transmitting plate 1 of the first embodiment, and is just a matter of design. That is why if those design values are introduced into Equation (4), the subject's depth information can be obtained by performing quite the same processing as in the first embodiment.

As can be seen, according to this embodiment, by adopting an image capturing optical system of the same configuration and performing the same signal processing as in the first embodiment and by using the light-transmitting plate 1 of which the diffraction grating is a linear one and where polarization filters are arranged on diffracted light transmitting regions, the subject's depth information can be calculated as in the first embodiment described above.

In the embodiment described above, the light-transmitting plate 1 is supposed to be configured so that the diffraction regions 1D4 are arranged as shown in FIG. 10A. However, this is just an example. Alternatively, the diffraction regions may be divided into two connected areas 1a as shown in FIG. 9A. Still alternatively, the diffraction regions may also be divided into three or more separate areas 1a as shown in FIG. 9B. The basic arrangement of the light-transmitting plate 1 and the image sensor 2 does not have to be a matrix of two rows by two columns. Furthermore, the polarization directions of the two kinds of polarization filters to use do not have to intersect with each other at right angles as long as a relation similar to the one represented by Equation (4) is satisfied. The same can be said about the polarization filters of the image sensor 2. That is to say, their basic arrangement does not have to have a checkerboard pattern but may also be a vertical striped arrangement or horizontal striped arrangement as well. The same statement as what has already been described for the first embodiment also applies to other modified examples.

Embodiment 3

Next, a third embodiment will be described. This embodiment relates to an image processor with no image capturing system. In the first embodiment described above, the image capture device is supposed to perform the image generation processing, matching the direct light image and the diffracted light images to each other, and calculate the magnitude of shift of the diffracted light images with respect to the direct light image by itself. However, such processing may be carried out by another device, not the image capture device itself. In that case, the image capture device itself does not have to include the image processing section 7 shown in FIG. 1.

The image processor of this embodiment has the same configuration as the signal processing section 200 shown in FIG. 1. The image processor may be built in the image capture device or may also be implemented as a computer such as a personal computer or a mobile telecommunications device.

The image processor receives pixel signals that have been generated by an image capture device with the configuration shown in FIGS. 2 to 5 or the configuration shown in FIGS. 10A and 10B, divides them into the D0, D1 and D2 images, and then performs the depth estimation processing shown in FIG. 7A, for example. Alternatively, the image processor may also perform the processing steps S701 through S703 shown in FIG. 7A and the processing steps shown in FIG. 7B. In this manner, the subject's depth information can be generated.

It should be noted that the image processing of this embodiment is applicable to not only images that have been obtained by an image capture device with the image capturing section 100 of the first or second embodiment but also any other arbitrary images that should be matched such as a plurality of images obtained by shooting the same subject from multiple different viewpoints. Particularly when a plurality of images with mutually different luminance levels (or contrasts) need to be matched, it is difficult to get that matching done accurately by a known method but even such matching can get done easily and accurately according to this embodiment. Since the processing of this embodiment is carried out with mutually different colors assigned to multiple images, the user can visually sense the degrees of matching between those images by performing such processing with those images presented on the display. As a result, the matching processing can get done much more easily than previously. Optionally, such an image processor may be configured to provide information indicating the magnitude of shift between multiple images or a matched synthetic image without generating depth information.

As can be seen, the image processor of this embodiment can easily match a plurality of images representing the same subject effectively. That is why this embodiment can be used not just to generate depth information but also in any application that ever needs matching multiple images to each other.

INDUSTRIAL APPLICABILITY

A depth estimating image capture device according to an embodiment of the present invention can be used effectively in every type of camera such as a digital camera, a digital movie camera, a solid-state camera for broadcasting, and an industrial solid-state surveillance camera.

REFERENCE SIGNS LIST

1 light-transmitting plate
1AB, 1CC light-transmitting plate's basic arrangement
1D1, 1D2, 1D4 diffraction region
1P1, 1P2, 2P1, 2P2 polarization filter (polarization region)
1CLR transparent region
2 solid-state image sensor
2a, 2b, 2c, 2d photosensitive cell
3 optical lens
4 infrared cut filter
5 signal generating and receiving section
6 sensor driving section
7 image processing section
7a image generating section
7b depth information generating section
8 interface section
30 memory
100 image capturing section
200 signal processing section

The invention claimed is:

1. A depth estimating image capture device comprising:
a light-transmitting section that is made up of a plurality of portions, each including a diffraction region that diffracts incoming light, a transparent region that transmits the incoming light without diffracting the light, and a polarization region arranged so as to overlap at least partially with the diffraction region;
an image sensor in which a plurality of unit elements are arranged two-dimensionally on an imaging area, wherein each of the unit elements includes a first photosensitive cell, a second photosensitive cell, and a polarization filter arranged so as to face the first photosensitive cell;
an imaging section configured to obtain images produced on the imaging area by the light transmitted through the transparent region and by the light transmitted through the diffraction region; and a signal processing section that processes a signal supplied from the image sensor.

2. The depth estimating image capture device of claim 1, wherein if the unit elements are arranged on the imaging area in x and y directions, the diffraction region is configured to generate mainly an $n^{th}$-order diffracted light ray (where n is an integer that is equal to or greater than one) and to make the $n^{th}$-order diffracted light ray incident at a point on the imaging area that has shifted in either the x direction or the y direction with respect to the point of incidence of the light that has been transmitted through the transparent region.

3. The depth estimating image capture device of claim 2, wherein if the diffraction region, the polarization region and the polarization filter are called a first diffraction region, a first polarization region and a first polarization filter, respectively, each of the plurality of portions of the light-transmitting section further includes a second diffraction region that generates mainly an $n^{th}$-order diffracted light ray and a second polarization region that is arranged so as to overlap at least partially with the second diffraction region and that has a different polarization transmission axis direction from the first polarization region, and each said unit element of the image sensor further includes a third photosensitive cell, and a second polarization filter that is arranged to face the third photosensitive cell and that has a different polarization transmission axis direction from the first polarization filter.

4. The depth estimating image capture device of claim 3, wherein the first and second diffraction regions are configured so that the $n^{th}$-order diffracted light rays that have gone out of the first and second diffraction regions are incident on the imaging area at respective points that are symmetric to a point of incidence of the light that has been transmitted through the transparent region.

5. The depth estimating image capture device of claim 1, wherein the diffraction region is configured to generate a zero-order diffracted light ray and $\pm n^{th}$-order diffracted light rays (where n is an integer that is equal to or greater than one), and wherein the polarization region includes a first polarization region that is arranged on the path of the $+n^{th}$-order diffracted light ray and a second polarization region that is arranged on the path of the $-n^{th}$-order diffracted light ray and that has a different polarization transmission axis direction from the first polarization region, and wherein each said unit element of the image sensor further includes a third photosensitive cell and a third polarization filter that is arranged to face the third photosensitive cell and that has a different polarization transmission axis direction from the first polarization filter.

6. The depth estimating image capture device of claim 3, wherein the polarization transmission axis direction of one of the first and second polarization regions is the same as the polarization transmission axis direction of one of the first and second polarization filters.

7. The depth estimating image capture device of claim 3, wherein the polarization transmission axis direction of the first polarization region intersects with the polarization transmission axis direction of the second polarization region at right angles, and wherein the polarization transmission axis direction of the first polarization filter intersects with the polarization transmission axis direction of the second polarization filter at right angles.

8. The depth estimating image capture device of claim 1, wherein the signal processing section includes an image processing section that obtains, based on respective output signals of the first and second photosensitive cells, a first image generated by the light that has been transmitted through the diffraction region and a second image generated by the light that has been transmitted through the transparent region.

9. The depth estimating image capture device of claim 6, wherein the image processing section generates information about the subject's depth based on the magnitude of shift between the respective positions of the subject on the first and second images.

10. The depth estimating image capture device of claim 3, wherein the signal processing section includes an image processing section that obtains, based on first, second and third signals supplied from the first, second and third photosensitive cells, respectively, first, second and third images generated by the light transmitted through the first diffraction region, the light transmitted through the second diffraction region, and the light transmitted through the transparent region, respectively.

11. The depth estimating image capture device of claim 8, wherein the image processing section generates information about the subject's depth based on the magnitude of shift between the positions of the subject on the first and third images and on the magnitude of shift between the positions of the subject on the second and third images.

* * * * *